Figure 1:
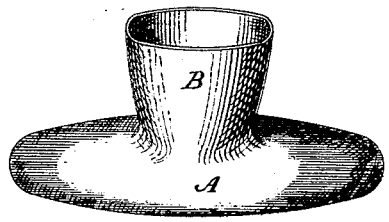
Figure 2:
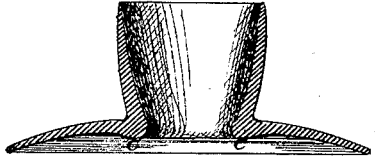

SAMUEL C. FOSTER.

Improvement in Nipple-Shields.

No. 114,281.  Patented May 2, 1871.

Witnesses.
Andrew Foster
W. S. Gray

Samuel C. Foster
Inventor.

United States Patent Office.

SAMUEL C. FOSTER, OF NEW YORK, N. Y., ASSIGNOR TO THE MONITOR SHIELD COMPANY.

Letters Patent No. 114,281, dated May 2, 1871.

IMPROVEMENT IN NIPPLE-SHIELDS.

The Schedule referred to in these Letters Patent and making part of the same.

I, SAMUEL C. FOSTER, of the city, county, and State of New York, have invented certain new and useful Improvements in the Form of Nipple-Shields, used for the prevention and cure of the sore nipples of nursing women, of which the following is a specification.

Nature and Objects of the Invention.

My invention consists of a shield, made of wood, glass, rubber, or other material, of such a shape or conformation as when applied to the nipple will leave the entire organ in contact only with the air, and at the same time protected from the clothing of the patient, as well as from the necessity of any dressings such as lints, plasters, compresses, &c.; also, by keeping up a gentle pressure upon the lacteal sinuses, lying beneath the base of the nipple, to prevent their being unduly distended, and to promote the easy flow of the milk.

The object of the invention is to prevent the occurrence of sore nipples and to render their cure easy, thereby removing one of the causes of abscesses in the breast and preventing much suffering.

Description of the Accompanying Drawing.

Figure I represents a perspective view of the shield.
Figure II represents a vertical section of the shield.

General Description.

The circular disk A, Fig. I, is slightly convex on the upper surface, and the turret B is open at the top.

The opening in the center of the under surface of the disk is beveled so as to admit the nipple easily into the turret.

The elevated rim C C, Fig. II, presses upon the lacteal sinuses around the base of the nipple, promoting the free flow of the milk.

The space between the rim C and the circumference of the disk is made decidedly concave, serving to keep the shield in place by atmospheric pressure.

The interior of the turret widens suddenly from its most narrow point at C, presenting somewhat the shape of a half-blown tulip, and preventing contact between the nipple and shield at any point.

I do not claim "a shield constructed with a tubular cap," and "which shall only encompass the nipple on its sides, and not cover the front end thereof," as described in Parker's patent of January 13, 1857, for my shield is a contrivance to produce results distinct from those aimed at by him, and I claim neither the principle nor the construction of his shield.

Claim.

I claim as my invention—

The combination of the circular disk, with elevated rim upon its under side, near the nipple opening, the concave under surface and the nipple turret, with the smallest diameter of its conical orifice at the point of union of the disk and turret, all arranged to form a nipple-shield, as described.

SAMUEL C. FOSTER.

Witnesses:
 WM. T. GRAY,
 ANDREW FOSTER.